Feb. 23, 1960 M. B. FINKELSTEIN ET AL 2,926,284
SAWTOOTH WAVE GENERATOR
Filed Feb. 25, 1957 2 Sheets-Sheet 1

INVENTORS.
Morris B. Finkelstein
& Hunter C. Goodrich
BY H. L. Mewton
ATTORNEY.

INVENTORS.
Morris B. Finkelstein
& Hunter C. Goodrich
BY
ATTORNEY.

United States Patent Office 2,926,284

Patented Feb. 23, 1960

2,926,284

SAWTOOTH WAVE GENERATOR

Morris B. Finkelstein and Hunter C. Goodrich, Collingswood, N.J., assignors to Radio Corporation of America, a corporation of Delaware Application February 25, 1957, Serial No. 641,902

18 Claims. (Cl. 315—27)

Figure 1:
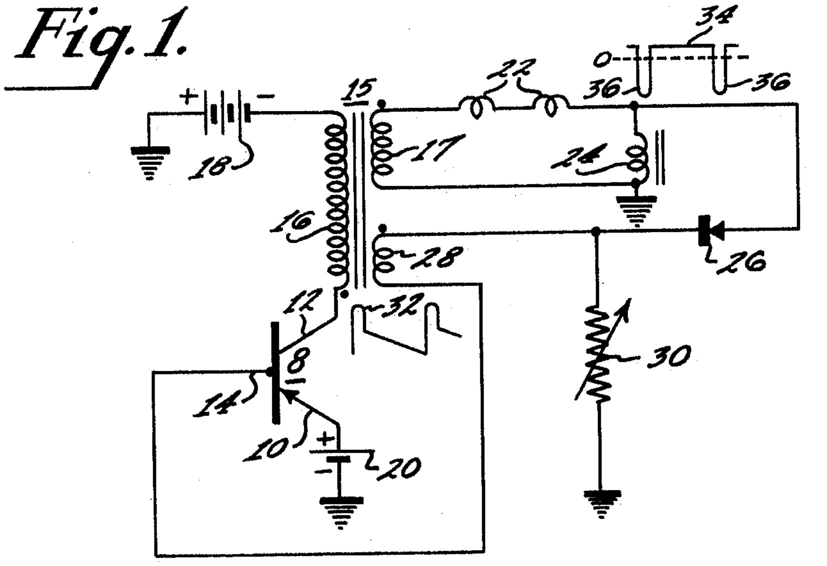

This invention relates to transistor sawtooth wave generators and in particular to sawtooth wave generators for use in the deflection circuits of television receiving systems and the like.

One of the problems encountered in the design of deflection circuits for television receiving systems in a type of distortion known as linearity distortion. Sawtooth voltage waves are generated in television receiving systems and are used to obtain vertical and horizontal deflection of the cathode ray tube beam. Ideally, the sawtooth voltage should increase in a linear manner. In practice, however, particularly in television vertical deflection circuits, it has been found that the usual commercial vertical deflection transformer introduces a type of distortion which tends to make the generated sawtooth wave nonlinear. In vertical deflection circuits using vacuum tubes, this distortion is compensated for by using a tube having a characteristic which will compensate for the nonlinearity introduced by the vertical deflection transformer. Commercially available transistors do not, however, exhibit a characteristic which will provide a similar compensating effect.

It is, accordingly, an object of the present invention to provide an improved sawtooth signal wave generator having a substantially linear sawtooth signal wave output suitable for television deflection circuits and the like while using transistors as the active operating elements thereof.

It is another object of the present invention to provide an improved and simplified television deflection circuit which is stable in operation and has substantially linear sawtooth wave output with commercially available transistors and deflection transformers.

It is a further object of the present invention to provide, in a transistor sawtooth wave generator suitable for use in television vertical deflection circuits, means for compensating for non-linearity distortion introduced by the vertical deflection transformer and providing a substantially linear sawtooth current waveform through the vertical deflection coils.

A sawtooth wave generator embodying the invention includes a transistor which is coupled to an inductive load circuit. A connection is made, in accordance with the invention, from the load circuit to the base electrode of the transistor so that voltage variations due to a variation in the rate of change of current flow through the load are applied to the base and alter the base-emitter bias of the transistor in a manner to compensate for variations in the rate of change of current in the load. A transformer secondary winding and a diode are connected in series between the base and the load circuit. The secondary winding provides a feedback voltage of a polarity and magnitude to provide regenerative operation of the sawtooth generator, while the diode provides an open circuit between the second secondary winding and the load circuit to permit rapid cutoff of the transistor.

Figure 2:
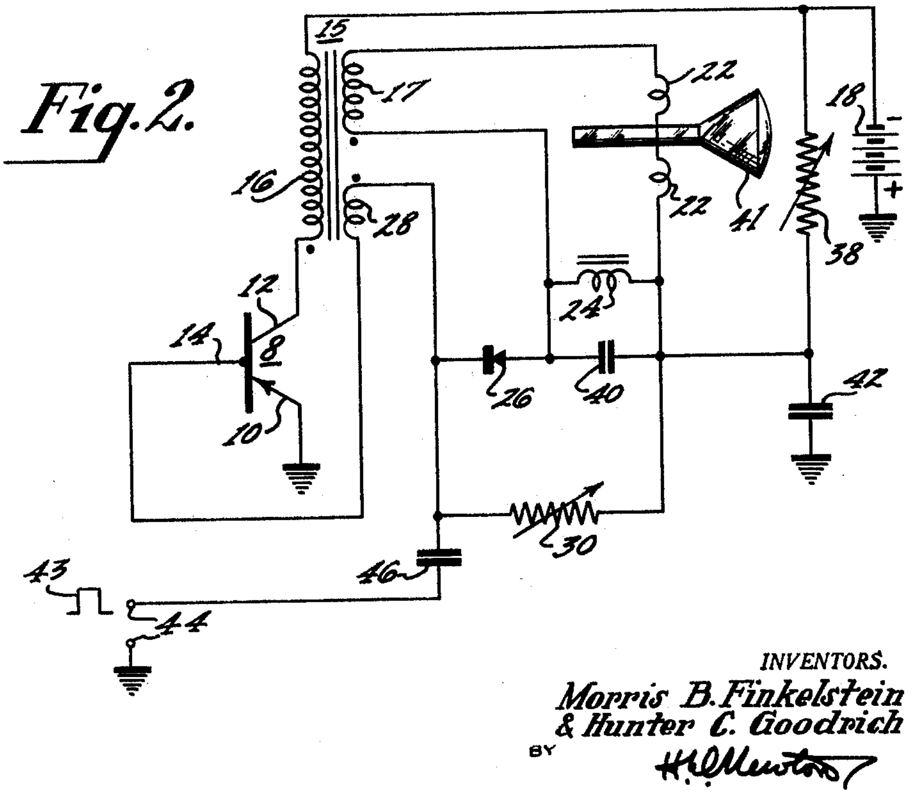
Figure 3:
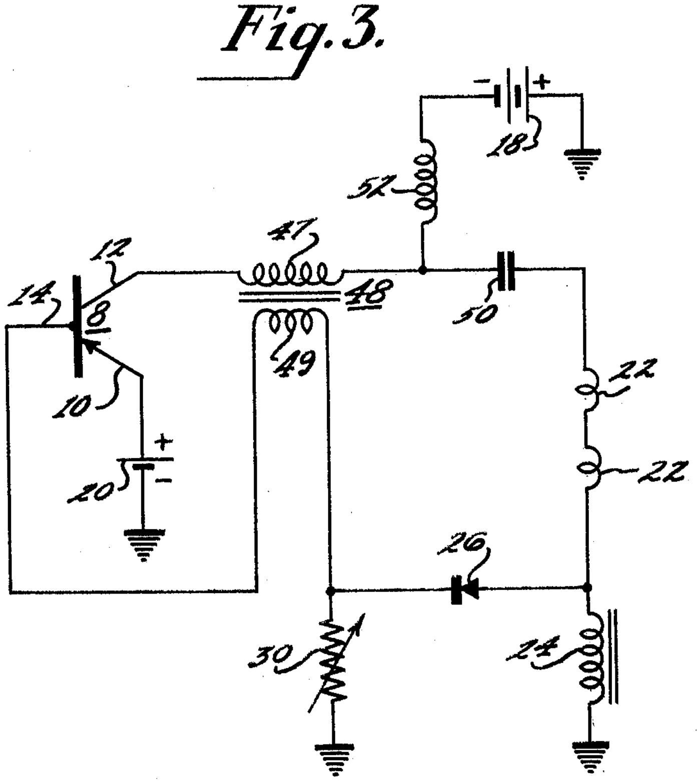

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a sawtooth wave generator embodying the invention, Figure 2 is a schematic circuit diagram of a television vertical deflection circuit embodying the invention, and Figure 3 is a schematic circuit diagram of a sawtooth wave generator illustrating another embodiment of the invention.

Referring now to the drawing, wherein like parts are indicated by like reference numerals in both figures, and referring particularly to Figure 1, a sawtooth wave generator circuit has as its active element a transistor 8, which may be considered to be of the P–N–P junction type and includes an emitter 10, a collector 12, and a base electrode 14. To provide proper biasing potentials for the transistor 8 for amplifying operation thereof, the collector 12 is connected through the primary winding 16 of an output transformer 15 to the negative terminal of a battery 18. The positive terminal of the battery 18 is connected to a point of reference potential for the circuit or chassis ground. The emitter 10 is constant-voltage biased by connecting it to the positive terminal of a battery 20, the negative terminal of which is connected directly to ground for the system, as indicated. The transformer 15 also includes a secondary winding 17, one terminal of which is connected directly to ground and the other terminal of which is connected through an output winding or inductor 22 and a linearity compensation or correction feedback winding 24 to ground. For television applications, the inductor 22 normally is the vertical deflection yoke or transformer and hence is shown in two sections.

The ungrounded or high signal potential end of the winding 24 is connected through a unilateral conducting device, illustrated as a diode 26, and a feedback winding 28 to the base electrode 14 of the transistor 8. The feedback winding 28 normally is a separate winding on the output transformer 15 as shown, and provides regenerative feedback or proper polarity and magnitude for generating the desired sawtooth waveform. The circuit is completed by the connection of a variable resistor 30 from the junction of the diode 26 and the feedback winding 28 to ground.

In operation, a first direct-current conductive path can be traced from the positive terminal of the emitter biasing battery 20, through the emitter 10 and the base 14 of the transistor 8, and through the feedback winding 28, the variable resistor 30 and ground to the negative terminal of the battery 20. A direct-current conductive path can also be traced through the emitter 10 and base 14, the feedback winding 28, the diode 26, the compensating winding or inductor 24 and ground to the negative terminal of the battery 20. A final direct-current path is provided from the positive terminal of the battery 20 through the emitter 10, the collector 12 and the primary winding 16 to the negative terminal of the collector biasing battery 18, and thence through ground to the negative terminal of the battery 20. When bias voltages are applied to the circuit, the collector current of the transistor 8 will increase, increasing the current flow through the primary winding 16 of the transformer 15. Through transformer action, the current through the output or load inductor 22 increases. The secondary winding 28 provides regenerative or positive feedback to the base 14 to increase collector current flow of the transistor 8. At the same time, current flow out of the base 14 increases, causing an increasing positive voltage drop across the varaible resistor 30. Eventually the cathode of the unilateral conducting device or diode 26 will become positive, which biases the diode 26 in the reverse relatively non-conducting direction. The diode 26, therefore, becomes non-conductive and provides, in effect, an open-circuit between the ungrounded terminal of the variable resistor 30 and the grounded terminal of the corrective winding 24. Since the base current must all flow through the variable resistor 30 when the diode 26 is reverse biased, the base current is reduced momentarily. The transistor 8 then is driven to cut-off by the rather large positive voltage pulse which is developed across the feedback winding 28 as the base current is reduced and as shown by the waveform 32. This positive voltage is applied to the base 14 and biases the emitter-base circuit of the transistor 8 in the reverse, relatively non-conducting direction. Current flow through the transistor 8 is thus rapidly reduced. Once cut-off is reached, the transistor current begins to increase again in a linear manner and the cycle repeats.

The corrective winding 24 is also effective to feed back a voltage to the base 14 of the transistor 8. This voltage is so related to variations in the current through the output load inductor 22 that a corrective bias is provided for the transistor 8 to compensate for current variations through the load inductor 22. The voltage developed across the inductive winding 24 is proportional to the rate of change of current through the load inductor 22. If, therefore, the voltage across the load inductor 22 is a linear sawtooth, the voltage across the corrective winding 24 will be constant except during flyback as shown by the waveform 34, the flyback pulses being indicated by the numeral 36. This voltage is applied in series with the diode 26 and the feedback winding 28 to the base 14 of the transistor 8. The diode 26 is normally biased in the forward direction, permitting the application of the corrective feedback voltage to the base 14. If the current through the output winding or yoke 22 increases too rapidly for any reason, the voltage across the corrective winding 24 will become more positive. This more positive voltage, when applied to the base 14 of the transistor 8, will decrease the forward emitter-to-base bias voltage of the transistor 8. Thus the transistor 8 will become less conductive and the current through the load inductor 22 will decrease to compensate for the original increase in current flow.

If, however, the current flow through the load inductor 22 decreases for any reason, the voltage developed across the corrective winding 24 will become less positive. This less positive voltage, when applied to the base 14 of the transistor 8, will tend to increase the forward emitter-to-base bias voltage of the transistor 8. Thus the transistor will become more conductive and the current through the load inductor 22 will increase to compensate for the original decrease in current flow. This feedback, as provided by the present invention, thus controls the current flow through the load inductor 22 and provides an automatic means for maintaining the sawtooth current through the output inductor or yoke 22 linear.

The frequency of the circuit may be varied by varying the resistance of variable resistor 30, or by altering the bias voltages. It is also to be noted that at higher frequencies, such as at the horizontal scanning frequency of a television system, the load inductor or yoke 22 is primarily inductive. In these cases, the separate corrective winding 24 may be eliminated and the yoke 22 connected in its place. The corrective feedback voltage will thus be derived across the yoke. It is also possible to increase the effect of the feedback by suitably amplifying the output voltage across the corrective winding 24 by a separate transistor, for example. In a television receiving system, raster height may be varied by varying the fixed voltage on the emitter by varying the voltage of the emitter biasing battery 20.

While a P–N–P junction transistor (i.e., a transistor of N type conductivity) has been used in Figure 1 to illustrate one embodiment of the invention, it is to be understood that transistors of an opposite conductivity type (i.e., P type conductivity), N–P–N junction transistors being an example, could be used. If P type transistors are used, the various biasing supplies would have to be reversed in polarity as would the polarity of the diode 26. In addition, the various waveforms as discussed for the illustrated embodiment would be reversed in polarity.

In Figure 2, reference to which is now made, a sawtooth wave generator circuit of the same general type as in Figure 1 has been adapted to operate from a single supply source such as a battery 18. In the former circuit, a fixed emitter-base bias voltage is obtained by connecting the emitter 10 to the positive terminal of the battery 20. In the circuit of Figure 2, it will be seen that the base bias is fixed and the emitter 10 is connected directly to ground. The base 14 is connected through the feedback winding 28 and a pair of serially connected variable resistors 30 and 38 to the negative terminal of the battery 18, while the collector 12 is connected through the primary winding 16 of the transformer 15 to the negative terminal of the battery 18 as in Figure 1. A direct-current conductive path is also provided from the base 14 through a diode 26, the corrective feedback winding 24, and the variable resistor 38 to the negative terminal of the battery 18. A by-pass capacitor 40 is connected in shunt with the corrective feedback winding 24 and serves as a low voltage shunt path for horizontal pulses that may be coupled through the load inductor or yoke 22. The yoke 22 in the present example has been illustrated as being the vertical deflection winding of a cathode ray tube or kinescope 41.

To maintain a constant base bias voltage for the transistor 8, a capacitor 42 is connected from the junction of the variable resistors 30 and 38 to ground. The deflection circuit may be synchronized by the application of positive sync pulses 43, which are applied to a pair of input terminals 44 and coupled through the coupling capacitor 46 and the feedback winding 28 to the base 14. The positive sync pulses will tend to cut off the transistor 8 at an earlier time in the cycle, thus serving as a means of synchronizing the operation of the circuit.

In operation, the circuit illustrated in Figure 2 is similar to the circuit in Figure 1 and provides automatic linearity control by developing a voltage, across the corrective feedback winding 24, which is applied to the base and which is proportional to the rate of change of current through the yoke 22. By using a single supply voltage and deriving the fixed base-emitter voltage across the capacitor 42, the need for a separate emitter circuit constant voltage source as in Figure 1 is eliminated. The voltage developed across the capacitor 42 acts in series with the voltage developed across the corrective feedback winding 24 to provide the same type operation explained in detail for Figure 1. An additional advantage of the circuit illustrated in Figure 2 is that the raster height may be easily varied by varying the resistance of the resistor 38, thus varying the base voltage. As in Figure 1, variation of the resistance of the resistor 30 provides a means for varying the frequency of operation.

While it will be understood that the circuit specifications may vary according to the design for any particular application, the following specifications are included by way of example only.

| | |
|---|---|
| Battery **18** | 20 volts. |
| Resistors **30** and **38** | 250 and 5,000 ohms, respectively. |
| Capacitors **40** and **42** | 0.15 and 100 microfarads, respectively. |
| Diode **26** | Commercial type 1N93. |
| Transistor **8** | Commercial type RCA TA-1614. |

In Figure 3, a further modification of the sawtooth signal wave generator circuit of Figure 1 is provided. It will be noted that the collector 12 of the transistor 8 is connected through the primary winding 47 of the transformer 48 and a blocking capacitor 50, to the inductive output load winding 22, rather than being transformer coupled as in the preceding circuits described. Thus, the secondary winding 17 used in the circuits of Figures 1 and 2 is eliminated. To provide proper collector biasing potentials for the transistor 8, the negative terminal of the battery 18 is connected through an isolating choke coil 52 and the primary winding 47 of the transformer 48 to the collector 12. The remaining portions of the circuit are similar to the circuit illustrated in Figure 1.

In operation, the collector current of the transistor 8 increases when biasing voltages are applied. Current flow through the primary winding 47, the capacitor 50 and the inductive load winding 22 thus increases. The voltage developed across the inductive feedback connection winding 24 is proportional to the rate of change of current through the load winding 22. This voltage is fed back to the base 14 of the transistor 8 to provide automatic linearity control as described above for Figure 1 and in accordance with the invention. The secondary winding 49 functions in the same manner as the winding 28 in Figures 1 and 2 and provides regenerative feedback to the base 14 to increase current flow of the transistor 8 and a feedback voltage of proper polarity to rapidly cut off the transistor. The function of the diode 26 and the resistor 30 are also the same as in Figure 1, the resistor 30 providing a means for varying the frequency of the generated sawtooth waveform.

As described herein, a sawtooth generator is reliable in operation. The circuits embodying the invention provide means for obtaining automatic linearity control to insure a linear sawtooth current across the output load. Thus, the invention is adapted for use in television deflection systems and particularly for use in the vertical deflection circuits of a television receiver where nonlinear distortion may be a problem.

What is claimed is:

1. A sawtooth generator comprising, in combination, a transistor including base, emitter, and collector electrodes, means including an inductive impedance element coupled with said collector electrode to provide an output load circuit for said generator and voltage variations in response to the rate of change of current through said inductive impedance element, means including a unilaterally conducting device connecting said inductive impedance element with said base electrode to provide voltage feedback to said base electrode to compensate for changes in the rate of change of current through said inductive impedance element, means for developing a feedback voltage in response to current flow of said transistor, and means for applying said feedback voltage to said base electrode to control current flow through said transistor.

2. A sawtooth generator comprising, in combination, a transistor including base, emitter, and collector electrodes, a transformer including a primary winding and a pair of secondary windings, means connecting said primary winding with said collector electrode, means including an inductor connected in series with one of said secondary windings to provide an output circuit for said generator and voltage variations in response to the rate of change of current through said inductor, and means including said other secondary winding connecting said inductor with said base electrode for applying said voltage variations to said base electrode to control current flow through said inductor and providing voltage feedback from said other secondary winding to said base electrode to control current flow through said transistor.

3. A sawtooth generator comprising, in combination, a transistor including base, emitter, and collector electrodes, a transformer including a primary winding and a pair of secondary windings, means connecting said primary winding with said collector electrode, means including an inductor connected in series with one of said secondary windings to provide an output load circuit for said generator and voltage variations in response to the rate of change of current through said inductor, means connecting the other of said secondary windings with said base electrode to provide voltage feedback to said base electrode for reducing current flow through said transistor and regenerative operation of said generator, and means for applying said voltage variations to said base electrode to control current flow through said inductor and provide a substantially linear sawtooth voltage thereacross, said last named means including a unilateral conducting device connected in series between said output load circuit and said other secondary winding.

4. A vertical deflection circuit for television receiving systems comprising, in combination, a transistor including base, emitter, and collector electrodes, means providing biasing potentials for said transistor including a pair of terminals of opposite polarity, a transformer including a primary winding and a pair of secondary windings, means connecting said primary winding in series between said collector electrode and one of said terminals, means connecting said emitter electrode to the other of said terminals, means including a deflection yoke and a feedback inductor connected in series with one of said secondary windings to provide an output load circuit for said generator and voltage variations across said inductor in response to the rate of change of current through said deflection yoke, means connecting one end of the other of said secondary windings with said base electrode to provide voltage feedback to said base electrode of a polarity and magnitude to reduce current flow through said transistor and provide regenerative operation of said generator, and means for applying said voltage variations to said base electrode to control current flow through said deflection yoke and provide a linear sawtooth voltage thereacross, said last named means including a unilateral conducting device connected from the junction of said deflection yoke and said feedback inductor to the other end of said other secondary winding.

5. A sawtooth generator for generating substantially linear sawtooth waves comprising, in combination, a transistor including base, emitter, and collector electrodes, a transformer including a primary winding and a pair of secondary windings, means connecting said primary winding with said collector electrode, means including an inductive load impedance element and a corrective feedback inductor connected in series with one of said secondary windings to provide an output circuit for said generator and voltage variations across said feedback inductor proportional to the rate of change of current through said load impedance element, and means including said other secondary winding connecting said feedback inductor with said base electrode for applying said voltage variations to said base electrode to control the linearity of a generated sawtooth wave and providing voltage feedback from said other secondary winding to said base electrode to control current flow through said transistor.

6. A vertical deflection circuit for television receiving systems comprising, in combination, a transistor including base, emitter, and collector electrodes; a transformer including a primary winding and a pair of secondary windings; each of said secondary windings including a pair of terminals; means providing a source of operating potentials including a pair of terminals of opposite polarity one of which is connected with the emitter electrode; conductive circuit means including said primary winding connecting said collector electrode with the other terminal of said source; a vertical deflection yoke and a linearity correction feedback inductor connected in series between the terminals of one of said secondary windings to provide an output load circuit for said generator and voltage variations across said feedback inductor in response to the rate of change of current through said yoke; circuit means connecting the other of said secondary windings serially in circuit with said base electrode to provide voltage feedback to said base electrode of a polarity and magnitude to reduce current flow through said transistor and to compensate for changes in the rate of change of current through said yoke and including a diode, said feedback inductor, and a first resistor connected serially between said other secondary winding and said source of operating potential, a second resistor connected in shunt with said series connected diode and feedback inductor; and a storage capacitor connected from the junction of said first and second resistors to ground for the circuit to provide a fixed base-emitter bias voltage for said transistor.

7. A vertical deflection circuit as defined in claim 6 wherein said first and second resistors are variable to provide variable height and frequency control, respectively, of said circuit.

8. A vertical deflection circuit as defined in claim 6 wherein means are provided for applying synchronizing pulses to said base electrode.

9. A sawtooth generator comprising, in combination, a transistor including base, emitter, and collector electrodes, a transformer including a primary winding and a pair of secondary windings, means connecting said primary winding with said collector electrode, means including an inductor connected in series with one of said secondary windings to provide an output circuit for said generator and voltage variations in response to the rate of change of current through said inductor, feedback circuit means for said generator including said other secondary winding and a normally forward-biased diode connecting said inductor with said base electrode for applying said voltage variations to said base electrode to control current flow through said inductor, and means providing a reverse bias voltage for said diode in response to increased base current flow of said transistor for developing a voltage across said other secondary winding of a magnitude to cut off said transistor.

10. A sawtooth generator comprising, in combination, a transistor including base, emitter, and collector electrodes, transformer means including a primary and a secondary winding, means including said primary winding and an inductor coupled with said collector electrode providing an output load circuit for said generator and voltage variations in response to the rate of change of current through said inductor, means including a diode and said secondary winding connecting said inductor with said base electrode to provide voltage feedback from said inductor to said base electrode to compensate for changes in the rate of change of current through said inductor, and means including said secondary winding for developing a feedback voltage in response to current flow of said transistor and for applying said feedback voltage to said base electrode to control current flow through said transistor.

11. A sawtooth generator comprising, in combination, a transistor including base, emitter, and collector electrodes, a transformer including a primary winding and a pair of secondary windings, means connecting said primary winding with said collector electrode, means including an output load inductor and a feedback winding connected in series with one of said secondary windings to provide an output circuit for said generator and voltage variations in response to current variations through said load inductor, means including a unilateral conducting device and said other secondary winding connecting said feedback winding with said base electrode for applying said voltage variations to said base electrode to control current flow through said inductor, and a resistor connected to the junction of said unilateral conducting device and said other secondary winding and adapted to be traversed by base current flow of said transistor to provide a voltage in response to increased base current flow above a predetermined magnitude to reverse bias said unilateral conducting device and reduce said base current flow, whereby a voltage is fed back to said base electrode from said other secondary winding to cut off said transistor.

12. A sawtooth generator comprising, in combination, a transistor including base, emitter, and collector electrodes, means including an inductor coupled with said collector electrode to provide an output load circuit for said generator and voltage variations in response to the rate of change of current through said inductor, means connecting said inductor with said base electrode to provide voltage feedback to said base electrode to compensate for changes in the rate of change of current through said inductor, means for developing a feedback voltage in response to current flow of said transistor, and means for applying said feedback voltage to said base electrode to control current flow through said transistor.

13. A vertical deflection circuit for television receiving systems comprising, in combination, a transistor including base, emitter, and collector electrodes, a transformer including a primary winding and a pair of secondary windings, each of said secondary windings including a pair of terminals, means providing a source of operating potential including a pair of terminals of opposite polarity, means including said primary winding connecting said collector electrode with one of the terminals of said source, means connecting said emitter electrode with the other terminal of said source, a vertical deflection yoke and a linearity correction feedback inductor connected in series between the terminals of one of said secondary windings to provide an output load circuit for said generator and voltage variations across said feedback inductor in response to current variations through said yoke, means connecting one terminal of said other secondary winding with said base electrode to provide voltage feedback to said base electrode to reduce current flow of said transistor, means including a unilateral conducting device connecting said feedback inductor with the other terminal of said other secondary winding whereby said voltage variations are applied to said base electrode to compensate for current variations through said yoke, and a variable resistor connected from the junction of said unilateral conducting device and the other terinal of said other secondary winding to a point of substantially fixed potential in said circuit to provide frequency control of said generator and a reverse bias voltage for said diode in response to increased base current flow of said transistor.

14. A sawtooth generator for generating substantially linear sawtooth waves comprising, in combination, a transistor including base, emitter, and collector electrodes; a transformer including a primary winding and a pair of secondary windings; means providing a first direct-current-conductive path including said emitter and collector electrodes, said primary winding, and a source of operating potential; means providing a second direct-current-conductive path including said emitter and base electrode, one of said secondary windings, and a resistor; means including an inductor connected in series with the other of said secondary windings to provide an output load circuit for said generator and voltage variations in response to current variations through said inductor; and means providing a third direct-current-conductive path including said emitter and base electrodes, said one secondary winding, a unilateral conducting device, and said inductor to provide voltage feedback from said one secondary winding to said base electrode of a polarity and magnitude to reduce current flow through said transistor and provide regenerative operation of said generator and to apply said voltage variations to said base electrode to control current flow through said inductor and provide a linear sawtooth voltage thereacross.

15. A sawtooth generator as defined in claim 14 wherein said resistor is variable to provide variable frequency control of said generator.

16. A sawtooth generator for generating substantially linear sawtooth waves comprising, in combination, a transistor including base, emitter, and collector electrodes, a transformer including a primary winding and at least one secondary winding, means connecting said primary winding with said collector electrode, means including an inductor connected in series with said secondary winding to provide an output load circuit for said generator and voltage variations in response to the rate of change of current through said inductor, means connecting said inductor with said base electrode to provide voltage feedback to said base electrode to compensate for current variations through said inductor, means including said secondary winding for developing a feedback voltage in response to base current flow of said transistor, and means for applying said feedback voltage to said base electrode to control current flow through said transistor.

17. A sawtooth generator, comprising, in combination, a transistor including base, emitter, and collector electrodes, transformer means including a primary and a secondary winding, means including said primary winding, a coupling capacitor, an output load inductor, and a corrective feedback winding connected in series in the order named between said collector electrode and a point of reference potential to provide an output load circuit for said generator and voltage variations across said feedback winding in response to the rate of change of current through said inductor, means including a normally forward-biased diode and said secondary winding connected from the junction of said inductor and said feedback winding to said base electrode to provide voltage feedback to said base electrode to compensate for changes in the rate of change of current through said inductor, and means including said secondary winding for developing a feedback voltage in response to current flow of said transistor for applying said feedback voltage to said base electrode to control current flow through said transistor.

18. A sawtooth generator as defined in claim 17 wherein a resistor is connected from the junction of said diode and said secondary winding to said point of reference potential.

References Cited in the file of this patent

UNITED STATES PATENTS

| | | |
|---|---|---|
| 2,467,699 | Richards | Apr. 19, 1949 |
| 2,574,245 | Court | Nov. 6, 1951 |
| 2,757,243 | Thomas | July 31, 1956 |
| 2,759,179 | Kircher | Aug. 14, 1956 |